United States Patent [19]
Billmers et al.

[11] Patent Number: 5,721,632
[45] Date of Patent: Feb. 24, 1998

[54] EXCITED STATE POLARIZATION ALTERING OPTICAL FILTER

[75] Inventors: Richard I. Billmers, Bensalem; Martin F. Squicciarini, Lansdale, both of Pa.; Swapan K. Gayen, Marlboro, N.J.

[73] Assignee: The United States of America as represented by the Secretary of the Navy, Washington, D.C.

[21] Appl. No.: 521,195

[22] Filed: Aug. 30, 1995

[51] Int. Cl.$^6$ .................................................. G02F 1/03
[52] U.S. Cl. .................. 359/252; 359/885; 250/338.5; 250/372
[58] Field of Search .................. 359/885, 252; 250/338.5, 372

[56] References Cited

U.S. PATENT DOCUMENTS 5,513,032  4/1996  Billmers et al. .................. 359/244

OTHER PUBLICATIONS

Pochi Yeh, "Dispersive magnetooptic filters", *Applied Optics*, vol. 21, No. 11, pp. 2069–2075, Jun. 1, 1982.

*Primary Examiner*—David C. Nelms
*Assistant Examiner*—Dawn-Marie Bey
*Attorney, Agent, or Firm*—Susan E. Verona; Ron Billi

[57] ABSTRACT

An excited state polarization altering optical filter includes a vapor cell having a population of electrons with a plurality of energy levels that receive light and transmit light according to the received light. A first pulsed dye laser applies a beam of light by way of a circular polarizer to provide a first beam of light having a first polarization to the vapor cell. The first beam of light causes transitions of the electrons from one energy level to another energy level. A second pulsed dye laser applies a second beam of light with a second, differing, linear polarization to the vapor cell. The vapor cell differentially transmits the first and second beams of light in accordance with the differing polarizations. A delay path is provided for delaying the second beam of light before the second beam of light is applied to the vapor cell. The delay path is tuned by adjusting the length. A third laser applies a beam of light to the first and second lasers. The third laser may be an Nd:YAG laser.

11 Claims, 5 Drawing Sheets

EXCITED STATE POLARIZATION ALTERING OPTICAL FILTER

STATEMENT OF GOVERNMENT INTEREST

The invention described herein may be manufactured by or for the Government of the United States of America for Governmental purposes without the payment of any royalties thereon or therefor.

FIELD OF THE INVENTION

This invention relates to optical filters for use in laser communications systems, laser radar systems and other laser systems to transmit predetermined frequency of light and reject other unwanted background radiation such as scattered sunlight in daytime applications.

BACKGROUND OF THE INVENTION

The object of optical filters, such as the optical filter of the present invention, is to filter light of a selected color, or frequency, and to do so with as narrow a bandwidth as possible. It is known in the prior art of optical filters to provide optical filters wherein layers having different characteristics are disposed on plates in order to shift colors. These optical filters are known as interference optical filters. However, interference filters are not very narrow and have very limited applications. They are limited by bandwidth and field of view.

It is also known in the prior art of optical filters to provide birefringent plates wherein the filter characteristics of the plates are dependent upon polarization sensitivity. Because birefringent optical filters use the interference effects of polarization they operate at more narrow specifications than interference filters. However, birefringent optical filters also bottom out and can not provide bandwidth below a known range because transmission drops below a useful level.

In order to obtain more narrow optical filtering than what is provided by interference filters and birefringent filters it is known to use atomic filters. Atomic filters use the characteristics of the atomic structure of selected elements to provide filtering and are therefore able to provide much more narrow specifications. These optical filters only work at certain predetermined wavelengths because there is no continuum in the atomic transition levels giving rise to the filter energy levels. Thus it is desirable to provide atomic filters which are capable of operating at other wavelengths, for example, at the specific wavelength of YAG.

One type of known atomic filter is the Faraday magnetic field rotatable polarization filter. In this type of optical filter a light is applied to the atoms of the filter and the polarization of the light is rotated. If polarization plates at 90° are used and rotation around the atomic energy levels is provided these optical filters can be extremely narrow.

The other type of atomic filter known in the art of optical filters is the absorption fluorescent atomic filter. When a photon from an incident light source strikes absorption fluorescent atomic filters it is absorbed by an atom in the filter causing an electron in the atom to rise from one energy level to a higher, or excited, energy level. When the excited electron falls from the higher energy level to an intermediate energy level the energy which is surrendered by the electron is emitted as light energy. The frequency of the re-emitted light depends on the difference between the excited energy level and the intermediate energy level. A detector senses the re-emitted light. The detector must be able to sense light which is faint with respect to the background light.

It is known to provide two types of absorption filters of this nature, ground state absorption filters and excited state absorption filters. In the ground state absorption filters the electrons which are excited by the incident photons are at their lowest energy level at the time of excitation by the incident photon. In the excited state absorption filters the electrons are pushed to a higher energy level prior to the arrival of the incident photon. The process of pushing the electron to the higher energy level is known as pumping. Thus, when the photon imparts energy to the electron in excited state filters the electron rises from one excited state to another, higher, excited state. When the electron falls from the higher excited level to some lower energy level, energy is again emitted as light energy and then sensed by a detector.

It is also known in the prior art to use an actively pumped optical filter, which is based upon the Faraday effect between two excited states. This type of optical filter includes a vapor cell having a population of electrons with a plurality of energy levels which receive light and transmit light according to a pumping mechanism. A magnetic source is provided for applying a magnetic field to the vapor cell. A pulsed dye laser applies a first beam of light to the vapor cell, causing transitions of the electrons from a first energy level to a second energy level. A second pulsed dye laser is used to measure the transmission through the vapor cell. A third laser applies a beam of light to the first laser and to the second laser. Polarizers are disposed before and after the vapor cell and a delay path is provided for delaying the second beam of light before the second beam of light is applied to the laser cell. This filter allows for a very narrow linewidth.

Thus, several types of optical filters have been developed previously for use in various laser communications and radar systems. Each of these prior art optical filters has its limitations.

Briefly, the optical filter of the present invention is based upon the Faraday effect between two excited states in atomic potassium vapor. As with an actively pumped optical filter, the filter transmission of the present filter results from a rotation of the plane of polarization of a linearly polarized beam of light. Unlike prior filters, however, no external magnetic field is necessary to cause the polarization rotation. Instead, an induced circular birefringence is believed to be responsible for the polarization rotation. The plane-polarized light is rotated $\pi/2$ radians with very little attenuation. An atomic vapor cell is placed between two cross-polarizers which block all wavelengths of light except those which have been rotated $\pi/2$ radians. This is the basis for a Faraday rotation optical filter.

The operation of this filter is based upon the $4P\frac{1}{2} \to 8S\frac{1}{2}$ excited-state transition in potassium vapor. The $4P\frac{1}{2}$ state is excited by a circularly polarized, 769.9 nm, 10 ns pulse from a dye laser. A linearly polarized, time-sequenced, and spatially overlapped probe pulse at 532.33 nm completes the transition to the $8S\frac{1}{2}$ state. The peak filter transmission is approximately 40% with a bandwidth of less than 4 GHz. This narrow linewidth is a significant improvement over previous filters.

SUMMARY OF THE INVENTION

An excited state polarization altering optical filter includes a vapor cell having a population of electrons with a plurality of energy levels that receive light and transmit light according to the received light. A first pulsed dye laser applies a beam of light by way of a circular polarizer to provide a first beam of light having a first polarization to the vapor cell. The first beam of light causes transitions of the electrons from one energy level to another energy level. A second pulsed dye laser applies a second beam of light with a second, differing, linear polarization to the vapor cell. The vapor cell differentially transmits the first and second beams of light in accordance with the differing polarizations. A delay path is provided for delaying the second beam of light before the second beam of light is applied to the vapor cell. The delay path is tuned by adjusting the length. A third laser applies a beam of light to the first and second lasers. The third laser may be an Nd:YAG laser.

DESCRIPTION OF THE PREFERRED EMBODIMENT

With reference to the attached drawings, there is disclosed the filter system and method of the present invention. The operation of a narrow-linewidth optical filter based on the $4P_{1/2} \rightarrow 8S_{1/2}$ excited-state transition in potassium vapor is reported. The $4P_{1/2}$ state is excited by a circularly polarized, 769.9-nm, 10 ns pulse from a dye laser. A linearly polarized, time-sequenced, and spatially overlapped probe pulse at 532.33 nm completes the transition to the $8S_{1/2}$ state. The peak filter transmission is approximately 40% with a bandwidth of less than 4 GHz. Corroborative experimental results suggest that the rotation of probe-pulse polarization by an induced circular birefringence is the dominant mechanism behind the filter operation.

Figure 1:
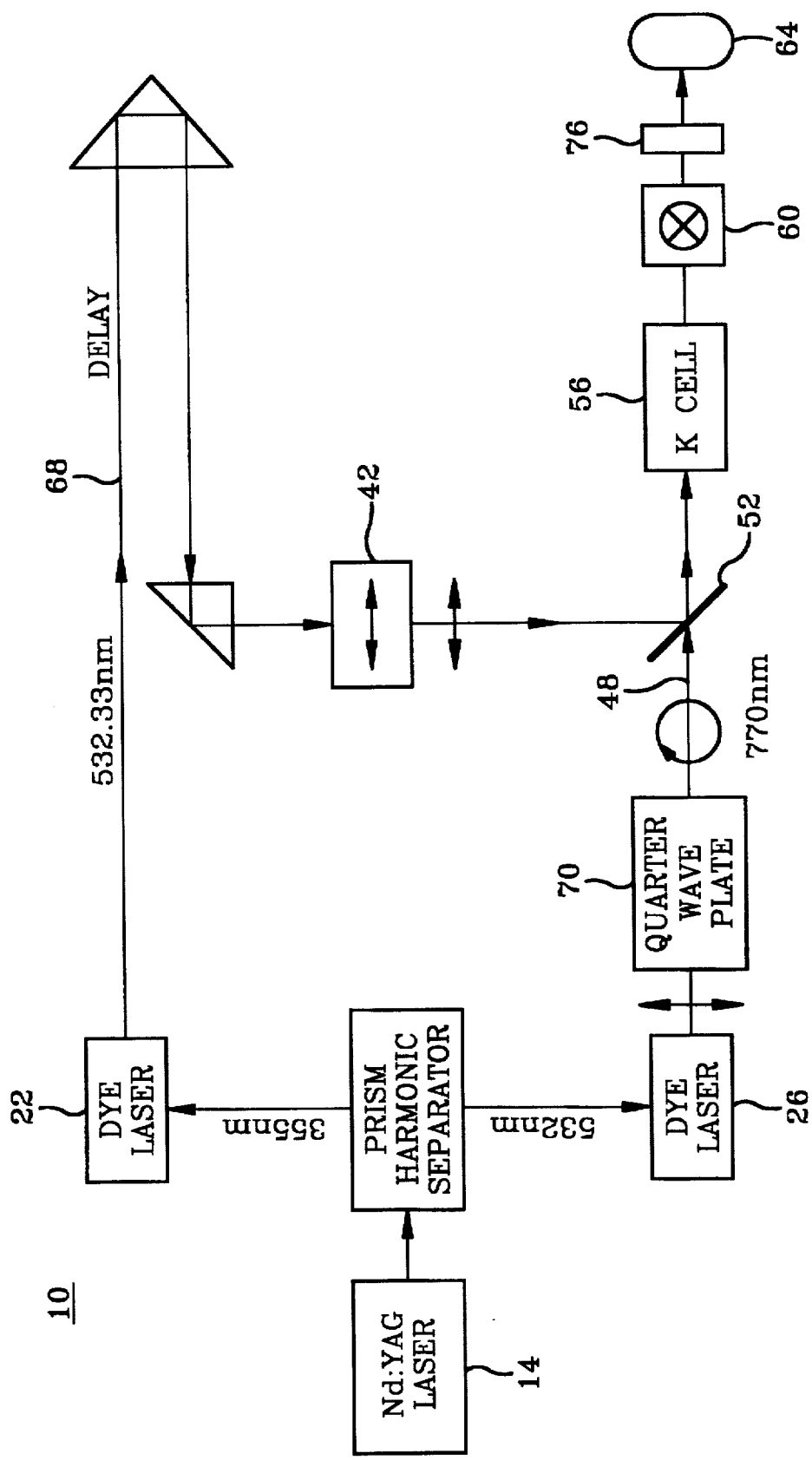
FIG. 1 shows a block diagram representation of the excited state polarization altering optical filter of the present invention.

The experimental arrangement used for demonstrating the filter operation is shown schematically in FIG. 1. The excited state polarization altering optical filter 10 is a high-transmission, narrow-linewidth optical filter that operates on the 532.33-nm $4P_{1/2} \rightarrow 8S_{1/2}$ excited-state transition in K vapor. The same transition has previously been used to develop an active atomic line filter (ALF) and an excited-state Faraday anomalous dispersion optical filter (ESFADOF). However, filter 10 is distinct from both the ALF as well as the Faraday anomalous dispersion optical filter (FADOF), also known as the Faraday filter. While the operation of ALF's is based on the excitation of a resonance transition in an atomic vapor followed by the detection of fluorescence at a different wavelength, optical filter 10 does not use a fluorescence-monitoring scheme. As in a typical FADOF or in the ESFADOF, the transmission of optical filter 10 results from a rotation of the plane of polarization of a linearly polarized beam of light. However, the mechanism behind the polarization rotation is different in the two cases.

In the case of Faraday filters, rotation is caused by the resonance enhancement and high dispersion of the Faraday effect near a narrow absorption line. Unlike the Faraday filters, no external magnetic field is necessary for the operation of optical filter 10. An induced circular birefringence is believed to be responsible for the polarization rotation of the optical filter 10. The circular birefringence results from an induced dichroism, that is, a difference in excited-state absorption of a left circularly polarized and a right circularly polarized beam of light. Thus, filter 10 may be called an induced-dichroism-excited atomic line filter.

Within optical filter 19, the K vapor of cell 56 is provided with a number density of $1.5 \times 10^{14}$ cm$^{-3}$ by heating a 7.5-cm-long cell 56 to 230° C. while maintaining the side-arm temperature at 200° C. A 769.9-nm circularly polarized pulse 48 from a pump dye laser 26 (Spectra-Physics PDL-1) populates the $4P_{1/2}$ excited state of cell 56 from the $4S_{1/2}$ ground state. A linearly polarized probe pulse 68 from a similar probe dye laser 22 nm completes the transition to the $8S_{1/2}$ state. The probe dye laser 22 operates at 532.33. A quarter wave plate 70 may be used to convert the output of the pump dye laser 26 from a linear polarization to circular polarization. The pump dye laser 26 and the probe dye laser 22 are excited by the second-harmonic and third-harmonic outputs, respectively, of the same Q-switched Nd:YAG laser 14 (Spectra-Physics DCR 2). The pulse repetition rate may be 10 Hz, and the duration may be approximately 10 ns, smaller than the spontaneous lifetime of 26 ns of the $4P_{1/2}$ state.

The diameters of the circularly polarized pump pulse 48 and the linearly polarized probe pulse 68 are approximately 1.1 and 0.65 mm, respectively. The diameters of the pulses 48, 68 are measured by scanning a razor blade across the respective beam profiles. Both pulses 48, 68 are spatially overlapped over the entire length of the K cell 56. Upon leaving the K cell 56, the pulses are passed through a Glan-Thompson analyzer 60 with its axis crossed to that of the polarizer 42 in the path of the probe pulse 68 before the K cell 56. The transmission of the probe pulse through the crossed polarizers is less than 0.001% when the K cell 54 is not pumped.

A photomultiplier tube 64 (Burle 31034A) is used to monitor the transmitted probe-pulse energy. A colored-glass filter and a narrow-band interference filter 76 are used before the detector 64 to ensure that the pump beam is effectively blocked. The signal from the detector 64 is digitized and averaged over thirty laser shots. The averages are stored in an IBM AT-compatible computer. A computer was interfaced to stepper motors that scanned the dye lasers 22, 26 by angle tuning the gratings used at the back mirrors of the cavities of the dye lasers 22, 26.

Figure 2:
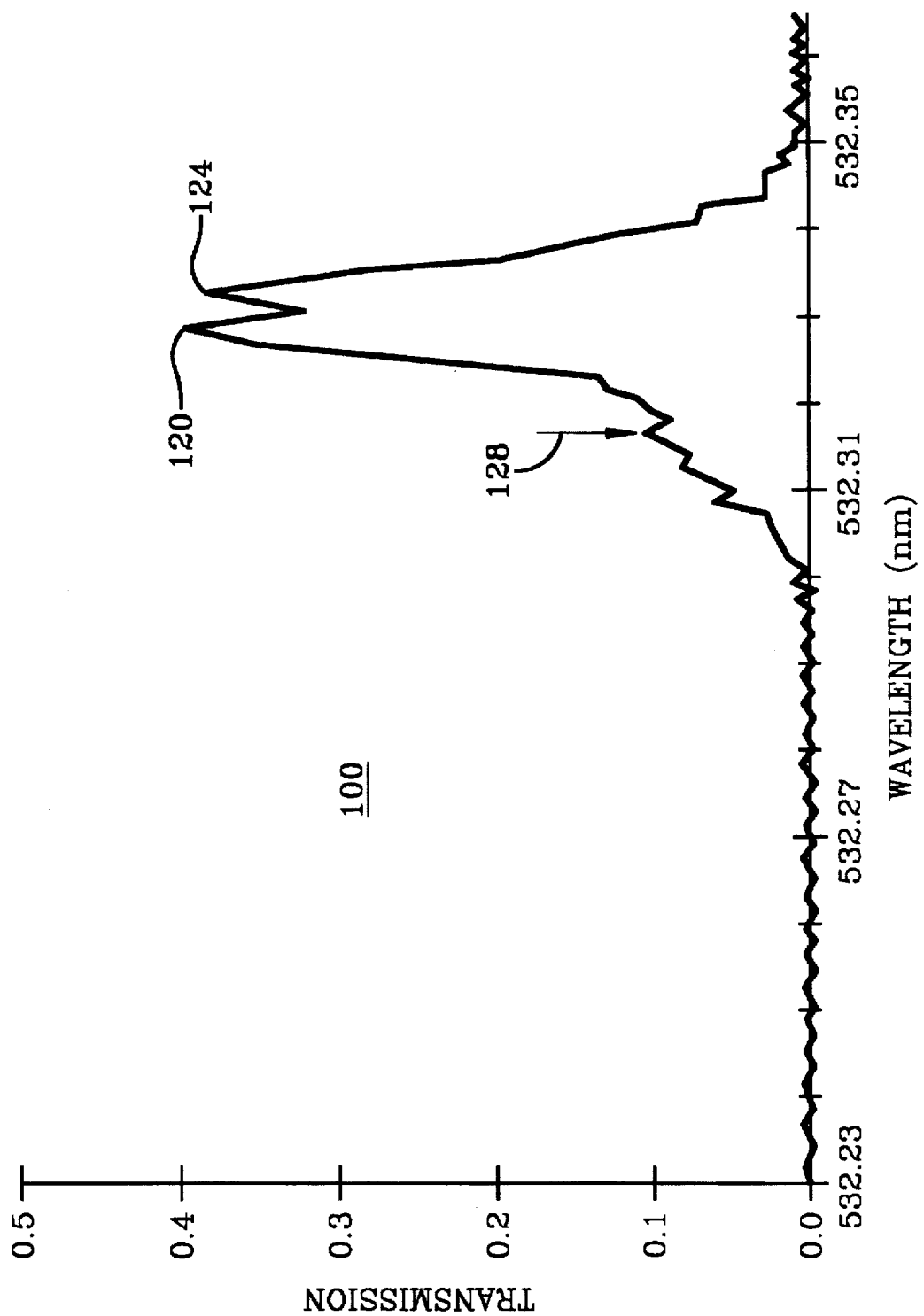
FIG. 2 shows a graphical representation of the optical transmission spectrum of the excited state polarization altering optical filter of the invention set forth in FIG. 1, measured with a probe dye laser of approximately 4 GHz.

Referring now to FIG. 2, there is shown a transmission spectrum 100 of the induced dichroism excited state polarization optical filter 10. The transmission spectrum 100 may be obtained by tuning the circularly polarized pump beam 48 with a peak intensity of approximately 0.8 MW/cm², and a pulse energy of 76 mJ, to the $4S_{1/2} \rightarrow 4P_{1/2}$ resonance at 769.9 nm. With the polarizers crossed, the low-intensity (10-mW/cm², 0.3-pJ/pulse) probe beam 68 is scanned through the $4P_{1/2} \rightarrow 8S_{1/2}$ transition. The intensity of the transmitted probe as a function of wavelength may be measured by the photomultiplier tube 64 and recorded. The optical filter 10 transmission at a particular wavelength is the ratio of the measured intensity to that measured with the pump beam blocked and the polarizers uncrossed.

The intensity of the pump beam 48 is approximately six times higher than the saturation intensity. The intensity of the probe beam 68 is at least five orders of magnitude smaller than the saturation intensity. The filter transmission reaches its optimum value near 532.33 nm. As the pump intensity is increased starting from 5 kW/cm$^2$, the peak transmission increases monotonically until a maximum of approximately 40% is reached at 0.8 MW/cm$^2$, then levels off and decreases slightly at even higher intensities. The transmission depends on the overlap between the pump pulse 48 and the probe pulse 68 and disappears when the pump pulse 48 is turned off or either of the two beams 48, 68 is tuned away from its resonance. This indicates that the optical filter 10 operates on the $4P_{1/2} \rightarrow 8S_{1/2}$ excited-state transition.

The principal feature of the transmission spectrum 100, two barely resolved peaks 120, 124, may be reproduced in repeated scans for all the pump intensities used in the experiment. The same feature was observed in the ESFADOF spectrum as well and was interpreted as the two characteristic peaks of a normal FADOF spectrum that could not be resolved with the broader-linewidth laser used in that experiment. Another feature in the transmission spectrum 100 is the broad shoulder, indicated by arrow 128. The broad shoulder of the transmission spectrum 100 is not prominent at low pump intensities but increases in strength and moves to shorter wavelengths with increasing intensity.

Figure 3:
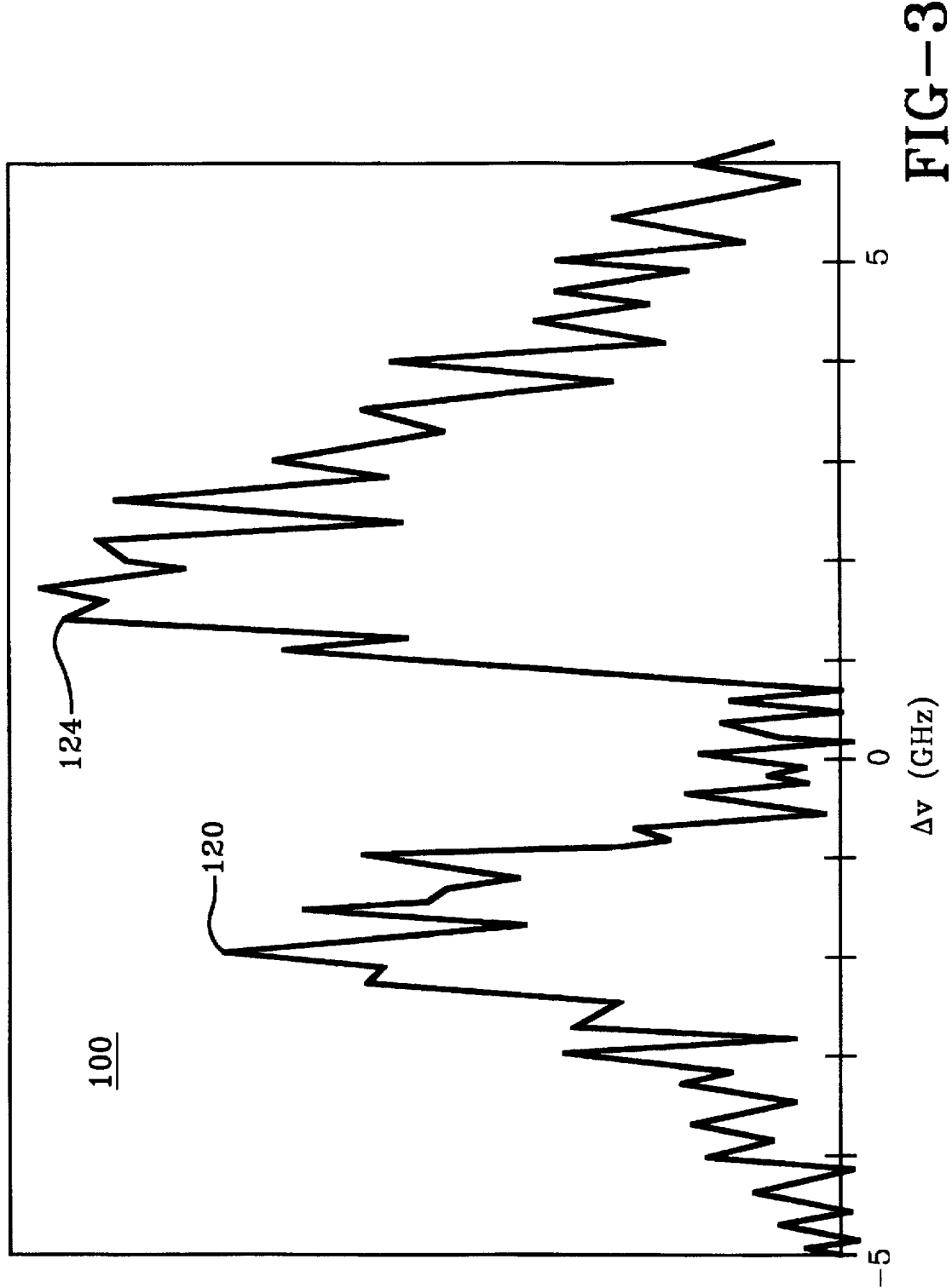
FIG. 3 shows a portion of the graphical representation of the optical transmission spectrum of the excited state polarization altering filter of the invention set forth in FIG. 2, measured with a resolution of approximately 1 GHz.

A measurement of the spectrum of the optical filter 10 under higher resolution may be made using a pressure-scanned étalon in the probe dye-laser cavity. Referring to FIG. 3, preliminary data is presented in an enlargement of the transmission spectrum 100, showing the two peaks 120, 124 each with a line width of approximately 3 GHz. However, because of the large pulse-to-pulse fluctuations in the dye laser energy that result from the insertion of the intracavity étalon, a reliable transmission measurement has not been possible.

Possible sources of background noise for the optical filter 10 are scattered 532-nm light from the Nd:YAG laser 14 and any excitation mechanism in the K vapor cell 56 that upconverts the 769.9-nm pump photons to photons near 532.33 nm. An initial noise measurement revealed no such noise down to the approximately 100-photon/pulse limit set by the scattered 532-nm photons from the Nd:YAG laser 14. This is similar to the background noise measurement of the ESFADOF operating on the same transition. Although emission at 404.5 nm was a major source of noise for the active ALF operating on this transition, it was not a problem for the optical filter 10.

Figure 4:
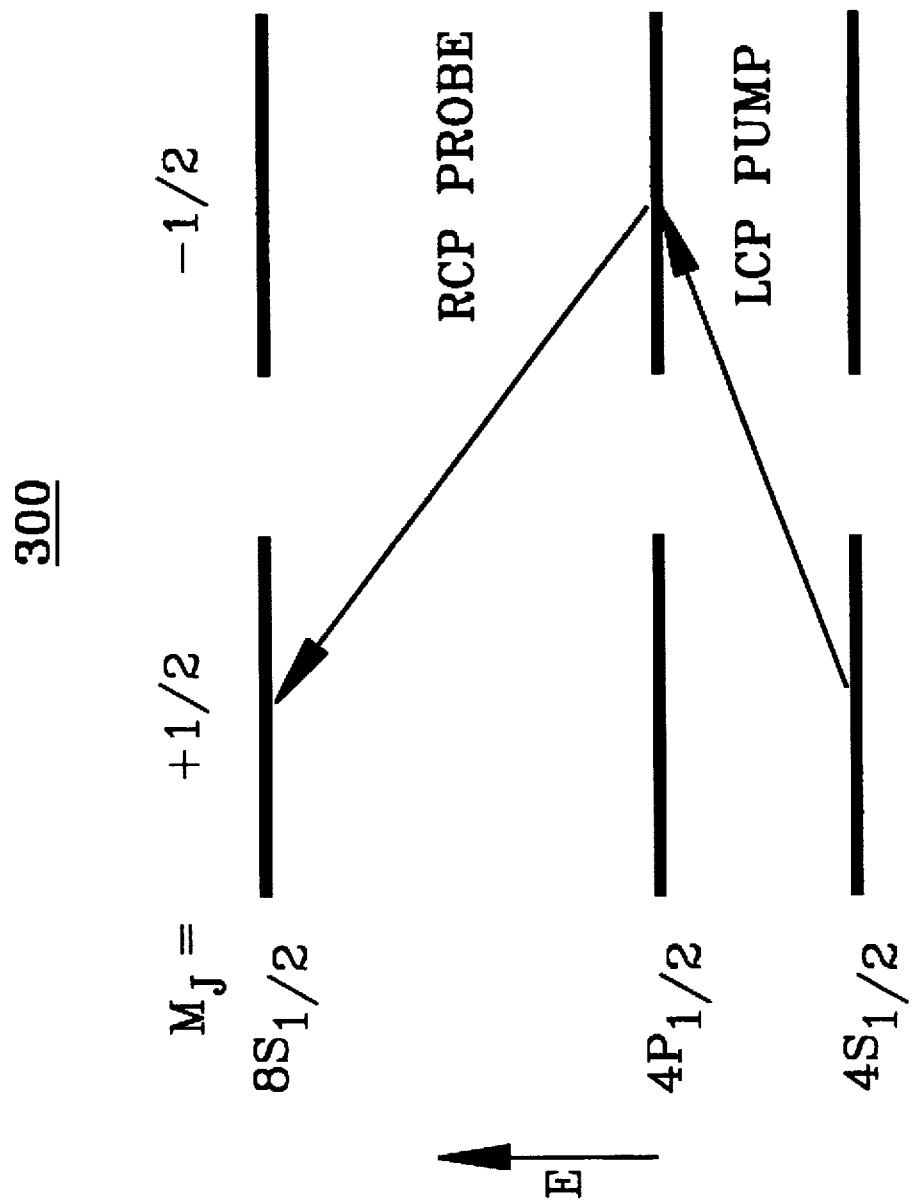
FIG. 4 shows a simplified energy level diagram of the excited state polarization altering optical filter of the invention set forth in FIG. 1, wherein the vapor cell of the optical filter is formed of potassium.

Referring to FIG. 4, there is shown a graphical representation illustrating the relevant atomic transitions of the operation of the optical filter 10 in a simplified energy-level diagram 300. In the absence of any external magnetic field, all three J=½ states are doubly degenerate with Mj=±½. According to the selection rules for electric-dipole transitions, a left circularly polarized light beam at 769.9 nm preferentially populates the $4P_{1/2}$(Mj=–½) state. Only a right circularly polarized probe beam at 532.33 nm can then initiate an absorptive transition from this state to the $8S_{1/2}$ (Mj=+½) state. Alternatively, a right circularly polarized pump followed by a left circularly polarized probe completes the stepwise transition to the $8S_{1/2}$ state (Mj=–½) via the $4P_{1/2}$ state (Mj=+½).

Preferential pumping by circularly polarized light of a particular helicity thus leads to a population difference between the two $4P_{1/2}$ states (Mj=+½ and –½). The linearly polarized beam is a combination of a right circularly polarized beam and a left circularly polarized beam of equal amplitudes. The absorption coefficients of the right circularly polarized and left circularly polarized components of the probe beam 48 are unequal from the preferentially excited $4P_{1/2}$ states. This excited-state circular dichroism in turn leads to a circular birefringence.

The rotation of the polarization direction of the probe beam 48 as a result of this induced circular birefringence is the key mechanism behind operation of the optical filter 10. In a FADOF the circular birefringence results from the resonance enhancement and high dispersion of the Faraday effect near a narrow absorption line. In the optical filter 10 the induced population difference between the two degenerate $4P_{1/2}$ states is believed to give rise to the circular birefringence.

Figure 5:
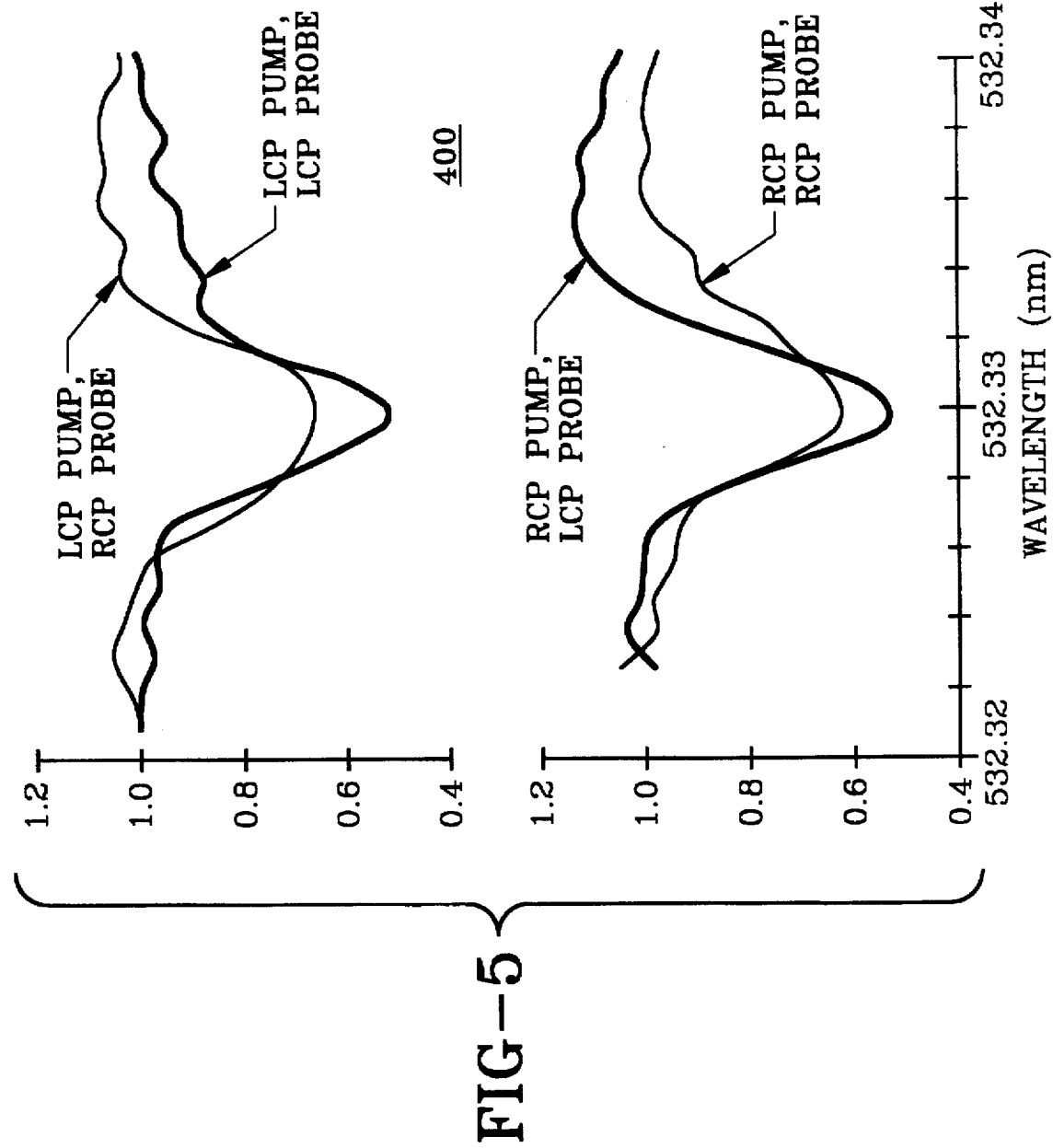
FIG. 5 shows the excited-state circular dichroism spectra of the excited state polarization altering optical filter of the invention set forth in FIG. 1.

To lend support to this explanation, the excited-state circular dichroism spectra 400 displayed in FIG. 5 may be measured using the following modifications of the experimental arrangement. First, an oriented λ/4 plate (not shown) may be inserted between the polarizer 42 and the beam combiner 52 to convert the linearly polarized probe beam into a circularly polarized beam. Second, the analyzer 60 may be removed. The helicity of the circularly polarized pump and probe beams is changed by changing the orientation of the respective λ/4 plate. All other parameters are kept the same as that used in the filter transmission measurement.

The difference in the excited-state absorption of the left circularly polarized and right circularly polarized probes in both sets of spectra is an indication of induced circular dichroism. Ideally, there should be no absorption of a probe beam of the same helicity as that of the pump beam. The measured absorption may be attributed to deviation from circular polarization of both the pump and the probe beams. The primary source of this deviation is the beam combiner 52. While the transmitted pump beam 48 remains fairly circular, the reflected probe beam 68 becomes somewhat elliptic.

Another possible source of deviation may be the decay of the polarization state as a result of self-collision. A kinetic theoretical estimate, using the experimental parameters of number density and temperature along with the literature value of spin-exchange self-collision cross section for K, yields a value of approximately eight μs for the mean time between collisions. Since the durations of the pump pulse 48 and the probe pulse 68 as well as the relative delay between them are all of the order of a few nanoseconds, the effect of self-collision would be negligible. However, even with the observed absorption in the like-polarization measurements, the spectra in FIG. 5 clearly demonstrate that circular dichroism and the associated circular birefringence are indeed induced by the circularly polarized pump beam 48. The preliminary predictions of a theoretical model are consistent with the experimental values.

Polarization altering optical filter 10 is of practical interest for several reasons. First, light at its operating wavelength of 532.33 nm has good atmospheric and underwater transmission. Second, the second-harmonic output of the Nd:YAG laser 14 can be readily temperature tuned to this wavelength. A rugged and well-developed solid-state laser such as laser 14 is essential for the construction and deployment of efficient filters such as optical filter 10 for underwater communication and laser radar systems. Third, the peak transmission of 40% obtained using optical filter 10 is an order of magnitude higher than that of the ESFADOF.

In summary, an efficient, narrow-band optical filter 10 at a wavelength of practical and operational interest has been demonstrated. However, its effect on future filter design may be more profound for two reasons. First, it introduces a new mechanism for developing optical filters. Second, by illustrating the usefulness of excited-state transitions in filter design, it draws attention to many more transitions that are available for developing frequency-agile filters.

Many modifications and variations of the present invention are possible in view of the above disclosure. It is therefore to be understood, that within the scope of the appended claims, the invention may be practiced otherwise than as specifically described.

We claim:

1. An excited state polarization altering optical filter for filtering incident light energy having a plurality of polarizations, comprising:

a vapor cell for receiving light energy and transmitting light energy from said vapor cell in accordance with said received light energy;

first and second lasers for providing first and second beams having first and second polarizations;

a circular polarizer for receiving the first beam and circularly polarizing said first beam;

a linear polarizer for receiving the second beam and linearly polarizing said second beam; and said vapor cell being adapted to receive said first and second beams and differentially transmit said first and second beams in accordance with said first and second polarizations.

2. The excited state polarization altering optical filter of claim 1, wherein said vapor cell has a population of electrons having a plurality of energy levels.

3. The excited state polarization altering optical filter of claim 2, wherein said first laser comprises an excitation source for applying excitations to said vapor cell and causing transitions of said electrons from a first energy level to a second energy level of said plurality of energy levels.

4. The excited state polarization altering optical filter of claim 3, wherein said second laser comprises an excitation source for applying excitations to said vapor cell while said electrons are in said second energy level.

5. The excited state polarization altering optical filter of claim 1, further comprising a delay path for delaying light energy before said delayed light energy is applied to said vapor cell.

6. The excited state polarization altering optical filter of claim 5, further comprising a tuner for tuning said delay path.

7. The excited state polarization altering optical filter of claim 6, wherein said tuner comprises means for adjusting the length of said delay path.

8. The excited state polarization altering optical filter of claim 1, wherein said vapor cell comprises a potassium vapor cell.

9. The excited state polarization altering optical filter of claim 1, further comprising a detector for detecting said differential transmission.

10. The excited state polarization altering optical filter of claim 1, further comprising a third laser for applying excitations to the outputs of said first and second lasers.

11. The excited state polarization altering filter of claim 10, wherein said third laser is a Nd:YAG laser.

* * * * *